July 15, 1958  A. V. BAKER  2,843,003

FILM CLARITY MEASURING APPARATUS

Filed March 13, 1957

INVENTOR.
Alfred V. Baker
BY
Griswold & Burdick
ATTORNEYS 2,843,003
Patented July 15, 1958

2,843,003

FILM CLARITY MEASURING APPARATUS

Alfred V. Baker, Lake Jackson, Tex., assignor to The Dow Chemical Company, Midland, Mich., a corporation of Delaware Application March 13, 1957, Serial No. 645,793

6 Claims. (Cl. 88—14)

This invention relates to a device for determining differences in the clarity of so-called clear plastic films, and particularly to apparatus for determining and recording the degree of diffusion of light transmitted through such film.

In determining the characteristics of batches of "clear" plastic film, one important test is the determination of the degree of clarity of the film. The usual test for film clarity has heretofore commonly been made by visual observation of the film. The visual observation method, however, has all the usual difficulties encountered with "opinion" types of measurement, plus the fact that, due to film aging effects, it is often impossible to make any realistic comparisons between film manufactured at different times.

Accordingly, a principal object of this invention is to provide an improved apparatus for determining the degree of clarity of transparent films.

Another object of this invention is to provide an improved apparatus for measuring and recording the light diffusion characteristics of so-called transparent films.

In accordance with this invention, apparatus is provided with a light source which projects a slit-shaped beam of light towards a transparent film which is disposed perpendicularly with respect to the beam. A photo-cell which is disposed on the side of the film which is opposite to light source is covered except for a small slit-like opening. The photo-cell is traversed across the light beam, the cell output being noted as a function of cell position. The distance the photo-cell travels while giving an output due to impingement on the cell of light from the slit-shaped beam is a function of the diffusion of the light beam by the film.

The invention, as well as additional objects and advantages thereof, will best be understood when the following detailed description is read in connection with the accompanying drawings, in which.

Figure 1:
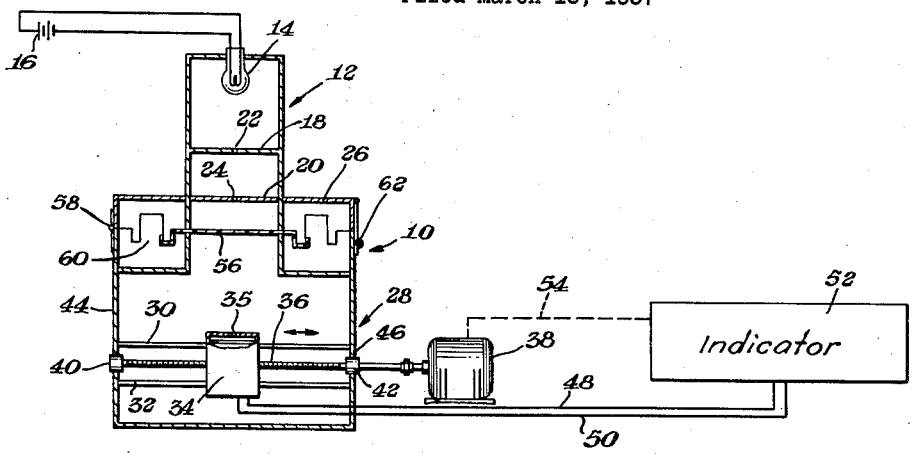
Fig. 1 is a diagrammatical view of light diffusion measuring apparatus in accordance with this invention.

Referring to Fig. 1, there is shown apparatus, indicated generally by the numeral 10, for indicating and measuring the clarity or, stated conversely, the diffusion of a light beam as it passes through a "clear" film, such as clear polyethylene film or vinyl films, for example. The apparatus includes an enclosed lamp housing 12 adapted to receive a source of illumination, such as an incandescent bulb 14 which may be energized by a suitable source such as a battery 16. A pair of transversely extending opaque partitions 18, 20 are disposed within the housing 12 on the same side of the lamp 14, and extend entirely across the housing 12. Each partition contains a slit, numbered 22 or 24, respectively. The slits 22, 24 are preferably identical in length and width and are parallel. The lower part 26 of the lamp housing is flanged outwardly and is the cover for the box-like photo-cell housing 28 which contains a pair of ways 30, 32 to which a photo-cell 34 is slidably mounted and contains a narrow light entry slit 35 in its cover. The photo-cell 34 is coupled to a worm 36 which is driven by a reversible motor 38. The worm 36 is journalled in bearings 40, 42 in the side walls 44, 46, respectively, of the cell housing 28. The photo-cell 34 is coupled, through the leads 48, 50 to an indicator 52. The indicator 52 may be a simple ammeter, or may be an electrically driven pen whose position with respect to a base or index position is a function of photo-cell output. The pen type indicator, if used, includes a chart (not shown) which is coupled (broken line 54) to the motor 38 to provide chart movement which is a function of linear movement of the photo-cell as it moves along the ways 30, 32.

The film 56 whose clarity is to be determined is placed over the upper part of the photo-cell housing 28 and the lamp housing 12, which is connected to the cell housing 28 by the hinge 58, is dropped over the top 60 of the cell housing 28 and clamped thereto by the hasp 62. The irregular surfaces along the top 60 and lower part 26 of the lamp housing 12 cause the film 56 to be stretched across the top part of the cell housing 28 as the lamp housing 12 is clamped to the cell housing 28.

In operation, the film 56 to be tested is stretched across the space between the lower partition 24 and the photo-cell 34 and is perpendicular with respect to the light beam. The photo-cell 34 is disposed, at the beginning of the test, on either the left or right side of the slits 22, 24 through which the light beam is to pass. The incandescent bulb 14 is illuminated and the light passing through the slits 22, 24 as a thin beam impinges on and passes through the film. The motor 38 is energized, rotating the worm and causing the photo-cell 34, coupled to the worm 36, to move along the ways 30, 32. The direction of rotation of the motor is chosen to traverse the photo-cell 34 across the light beam which has passed through the film. The light which passes through the slit 35 in the photo-cell cover causes potential to be induced by the cell 34, the potential being applied to the indicator 52 through the leads 48, 50. If the indicator 52 is a simple meter, the meter output may be recorded as a function of the position of the light entry slit 35 of the photo-cell 34 with respect to the plane passing through the slits 22, 24.

Figure 2:
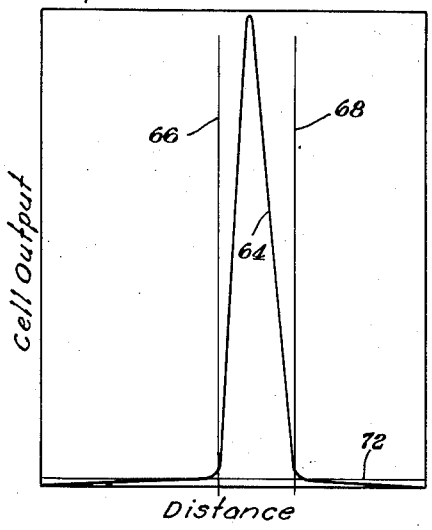
Fig. 2 is a graph showing photo-cell output as the cell is traversed across the light beam with no intervening film.

Fig. 2 shows, as a graph 64, the output of the photo-cell 34 as it is traversed across the light beam (not shown) passing through the beam collimating means, the slits 22, 24 with no film in the path of the light beam. Note that almost the entire output of the photo-cell occurs within the lines 66, 68 representing by the width of the light beam slits 22, 24.

Figure 3:
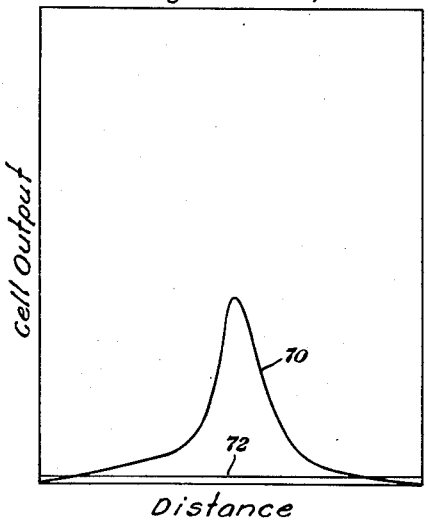
Fig. 3 is a graph showing photo-cell output as the cell is traversed across a light beam which has passed through an intervening film.

Fig. 3 is similar to Fig. 2, except that the graph 70 represents the output of the photo-cell 34 as the cell is traversed across a beam of light which passes through a film 56 which diffuses some of the light. It should be noted that the diffusion of the light by the film 56 both reduces the peak height of the cell output curve 70 and broadens the base of the curve. However, since a stained glass will reduce the light transmission through the glass, yet the glass may be very transparent, the base width of the photo-cell output graph is the significant indication of clarity. The breadth of the curve may be defined as the distance between the points where the amplitude of the curve of the graph exceeds a predetermined value which is above the noise output level of the photo-cell 34 (or photo-cell plus an amplifier coupled between the cell and the indicator). The "predetermined value" is, for example, shown as the line 72 in Figs. 2 and 3. While no control circuitry has been shown for the motor 38, it is recognized that limit switches (not shown) may be installed along the ways 30, 32 and the motor reversing switches (also not shown) of any suitable type may be used to control the direction of rotation of the worm and thus control the direction of travel of the photo-cell.

While the curve 70 illustrates the use of the invention to detect and measure the degree of light diffusion by a film, other films will result in curves of varying shapes.

I claim:

1. Apparatus for determining the clarity of a transparent film, comprising light beam producing means including a lamp housing having a closed end and an open end and side walls, a light source, said light source being disposed near to the closed end of said lamp housing, light beam collimating means, said light beam collimating means being disposed within the lamp housing between the light source and the open end of the lamp housing, a photo-cell housing having a closed end and an end having an opening therein, said opening facing the light source, a pair of ways, said ways being disposed within the photo-cell housing in a plane perpendicular to the axis of the collimating means, a photo-cell assembly including a photo-sensitive cell disposed beneath a cover having a narrow slit therein facing the light source, said photo-cell assembly being mounted on said ways, means for moving said photo-cell assembly along said ways, an indicator which is responsive to any electrical output of said photo-cell, means for electrically coupling the indicator to the photo-cell, and means for disposing a film perpendicularly across any light beam formed by the light beam collimating means.

2. Apparatus in accordance with claim 1, wherein said light beam collimating means comprises a plurality of partitions extending transvesrely across said lamp housing between the light source and the open end of the lamp housing, each partition having a narrow slit therein, the slits all being in a plane which is perpendicular to the ways in the photo-cell housing.

3. Apparatus in accordance with claim 1, wherein said light source is an incandescent lamp.

4. Apparatus in accordance with claim 1, wherein the means for moving said photo-cell is a worm which is coupled to the photo-cell assembly and is rotated by a reversible electric motor.

5. Apparatus in accordance with claim 1, wherein said indicator comprises a mechanically driven chart and an electrically driven recording pen which is coupled to the photo-cell.

6. Apparatus in accordance with claim 2, wherein the slit in the photo-cell cover is aligned with the slits in said light beam collimating means.

No references cited.